Patented Nov. 8, 1938

2,136,094

UNITED STATES PATENT OFFICE 2,136,094

PREPARATION OF PIPERAZINE

Alexander L. Wilson, Pittsburgh, Pa., assignor to Carbide and Carbon Chemicals Corporation, a corporation of New York No Drawing. Application July 7, 1936, Serial No. 89,481

7 Claims. (Cl. 260—268)

This invention relates to the preparation of piperazine through the deammoniation of diethylene triamine by heat in the presence of its hydrohalides as catalysts.

Piperazine,

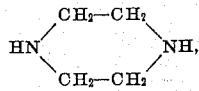

is a diimine melting at 104° C. and boiling at 145° C. Because of its special properties, this substance appears to be useful in the preparation of pharmaceutical and medicinal products, dyes, emulsifying agents, and as a starting point or intermediate inorganic syntheses generally. The development and use of this material has been seriously hindered to date, owing to the lack of economical methods for its preparation.

The principal object of this invention is to provide an improved process of preparing piperazine economically and efficiently by the deammoniation of diethylene triamine by the action of heat in the presence of its hydrohalides as catalysts. By the operation of the new process, piperazine can be obtained directly and in good yields as a primary product, and the advantages of the invention will be apparent.

The reaction in the operation of my new process apparently proceeds as follows:

(1) $NH_2.CH_2.CH_2.NH.CH_2.CH_2.NH_2 =$
Diethylene triamine $$HN\begin{matrix}CH_2.CH_2\\ \\CH_2.CH_2\end{matrix}NH + NH_3$$

Piperazine and simultaneously with this reaction may occur a secondary reaction:

(2) $NH_2.CH_2.CH_2.NH.CH_2.CH_2.NH_2 + NH_3 =$
Diethylene triamine
$2NH_2.CH_2.CH_2.NH_2$
Ethylene diamine in which part of the ammonia liberated in reaction (1) may be consumed. The following examples will serve to illustrate the invention:

Example I

A mixture of diethylene triamine and its hydrochloride was prepared by heating 80 parts by weight of diethylene triamine with 50 parts by weight of ethylene diamine dihydrochloride to a temperature of about 165° C., at which point the mixture became homogeneous. At about 230° C. the theoretical amount of anhydrous ethylene diamine was removed as a distillate. The liquid residue consisted of two layers, most probably comprising diethylene triamine and diethylene triamine dihydrochloride. Continued heating caused this system to boil, and a vaporous mixture of ammonia, piperazine, and diethylene triamine was evolved. These vapors were led through a short fractionating column and into a bulb receiver for the condensation of the piperazine, which was collected as a white solid. The ammonia evolved can be recovered by any suitable means. In order to provide continuous operation of the process, additional diethylene triamine was added to the boiling mixture at such a rate as to maintain the temperature in the reaction mixture between 240° and 260° C. In this manner, an additional 75 parts by weight of diethylene triamine were added. The residue remaining in the still was treated with excess sodium hydroxide solution, and the amine layer which formed was separated by gravity, and fractionally distilled. The distillate thus obtained was combined with that originally produced, and the whole was refractionated. Pure piperazine was isolated in an amount equal to a yield of 31% based on the total diethylene triamine added, of which 26% was recovered unchanged.

Example II

A mixture of diethylene triamine and its hydrochloride was prepared by bringing together 103 parts by weight of diethylene triamine and 54 parts by weight of ammonium chloride and heating the mixture to eliminate the ammonia and to form a hydrochloride of the diethylene triamine. When the initial evolution of ammonia had ceased, the temperature of the mixture was raised to between 240° and 260° C., and piperazine and ammonia were distilled off as shown in Example I. The concentration of reactants was maintained in the mixture, and the temperature of the reaction was held between 240° and 260° C. by the gradual addition of 309 parts by weight of diethylene triamine. The still residue was finally heated to 265° C., and 100 parts by weight of tetraethylene pentamine was added to the reaction vessel. The temperature was then raised to 300° C. in order to drive off any remaining piperazine and unreacted diethylene triamine, these compounds being displaced from their hydrochlorides by the less volatile amine. The total distillate was condensed at room temperature, and carefully refractionated. The yield of piperazine amounted to 42% based on the total diethylene triamine, of which 27% was recovered unchanged. Ethylene diamine, formed according to reaction (2), was recovered from the products in an amount equal to a yield of 7.5%.

It will be apparent that the diethylene triamine hydrochloride may be replaced by other hydrohalides of this amine, and that the method of preparing the hydrochloride, or other hydrohalide, for use as a catalyst, is not essential to my invention. The process may be operated continuously or discontinuously as desired. Atmospheric pressure is preferred, but other operating pressures are not precluded. In general, reaction temperatures of 220° to about 260° C. are desirable, but higher temperatures are permissible.

The formation of piperazine by the method of this invention appears to be peculiar to diethylene triamine in the presence of its hydrohalides, since experiments conducted in similar manner using triethylene tetramine failed to produce any significant amounts of piperazine.

Modifications of the process are included within the invention as defined by the appended claims.

I claim:

1. The method of preparing piperazine comprising heating a liquid mixture containing free diethylene triamine in the presence of one of its partial hydrochlorides, and distilling piperazine from the mixture.

2. The method of preparing piperazine comprising heating free diethylene triamine in the liquid phase and in the presence of one of its partial hydrohalides at a temperature of at least about 220° C., and recovering piperazine as a distillation product.

3. The method of preparing piperazine comprising heating diethylene triamine in the liquid phase and in the presence of one of its partial hydrochlorides, at temperatures of from about 220° to about 300° C., and recovering piperazine as a distillation product.

4. The method of continuously preparing piperazine comprising heating liquid diethylene triamine in the presence of one of its partial hydrohalides, to the boiling point of the mixture, supplying additional diethylene triamine to the heated mixture, and continuously removing piperazine as a distillation product.

5. In a process for making piperazine, the steps which comprise heating diethylene triamine with a hydrohalide of one of the group consisting of ammonia and volatile alkyl substituted ammonia products to form a mixture of diethylene triamine and its hydrohalides, and thereafter heating the system to temperatures of about 240° to about 260° C., and recovering piperazine as a distillation product.

6. In a process for making piperazine, the steps which comprise heating diethylene triamine with ethylene diamine dihydrochloride, liberating the reformed ethylene diamine, and thereafter heating the system to temperatures of about 240° to about 260° C., and recovering piperazine as a distillation product.

7. In a continuous process for making piperazine, the steps which comprise heating diethylene triamine with ethylene diamine dihydrochloride, liberating the reformed ethylene diamine, and thereafter heating the system to temperatures of between about 240° and about 260° C. while adding diethylene triamine at such a rate as to maintain the reaction temperature substantially constant, and recovering piperazine as a distillation product.

ALEXANDER L. WILSON.